United States Patent [19]
DeVale

[11] 3,724,474
[45] Apr. 3, 1973

[54] APPARATUS FOR MONITORING AND CONTROLLING HALOGEN LEVELS IN A WATER TREATMENT SYSTEM

[75] Inventor: Donald P. DeVale, Schaumburg, Ill.

[73] Assignee: Halogen Controls, Inc., Barrington, Ill.

[22] Filed: Sept. 20, 1971

[21] Appl. No.: 181,813

[52] U.S. Cl. ............................137/5, 137/88, 137/93, 324/61 R, 324/65 R
[51] Int. Cl. .......................G05d 11/08, G05d 21/02
[58] Field of Search.........137/5, 88, 3, 93; 324/61 R, 324/65 R

[56] References Cited

UNITED STATES PATENTS

| | | | |
|---|---|---|---|
| 2,526,515 | 10/1950 | Stein | 137/93 X |
| 2,559,090 | 7/1951 | Potter | 137/93 |
| 2,638,784 | 5/1953 | Cesaro et al. | 324/65 R X |
| 2,812,491 | 11/1957 | Figlio et al. | 324/65 R X |
| 3,180,038 | 4/1965 | Chafee | 324/65 R X |
| 3,281,681 | 10/1966 | Stevenson | 324/65 R |
| 3,475,316 | 10/1969 | De Vittorio | 324/61 R X |
| 3,524,724 | 8/1970 | Every et al. | 137/5 X |

*Primary Examiner*—Martin P. Schwadron
*Assistant Examiner*—David J. Zobkiw
*Attorney*—Hill, Sherman, Meroni, Gross & Simpson

[57] ABSTRACT

The halogen level in a water treatment system is monitored and controlled by a method which includes continuous sensing of the halogen level in a flow of the water under treatment, detecting insufficient halogen levels, adding halogen in response to detection of insufficient halogen levels, and terminating the addition of halogen upon detection of a second halogen level which is above that of the first-mentioned level. Apparatus for carrying out this method includes a pair of electrodes disposed in a stream of the fluid undergoing treatment, a charge storage device connected across the electrodes, means for pulsing the electrodes and charged storage device, means for detecting the decay of stored charge as a function of the halogen level of the fluid and means for controlling the addition of halogen in accordance with desired halogen levels.

14 Claims, 4 Drawing Figures

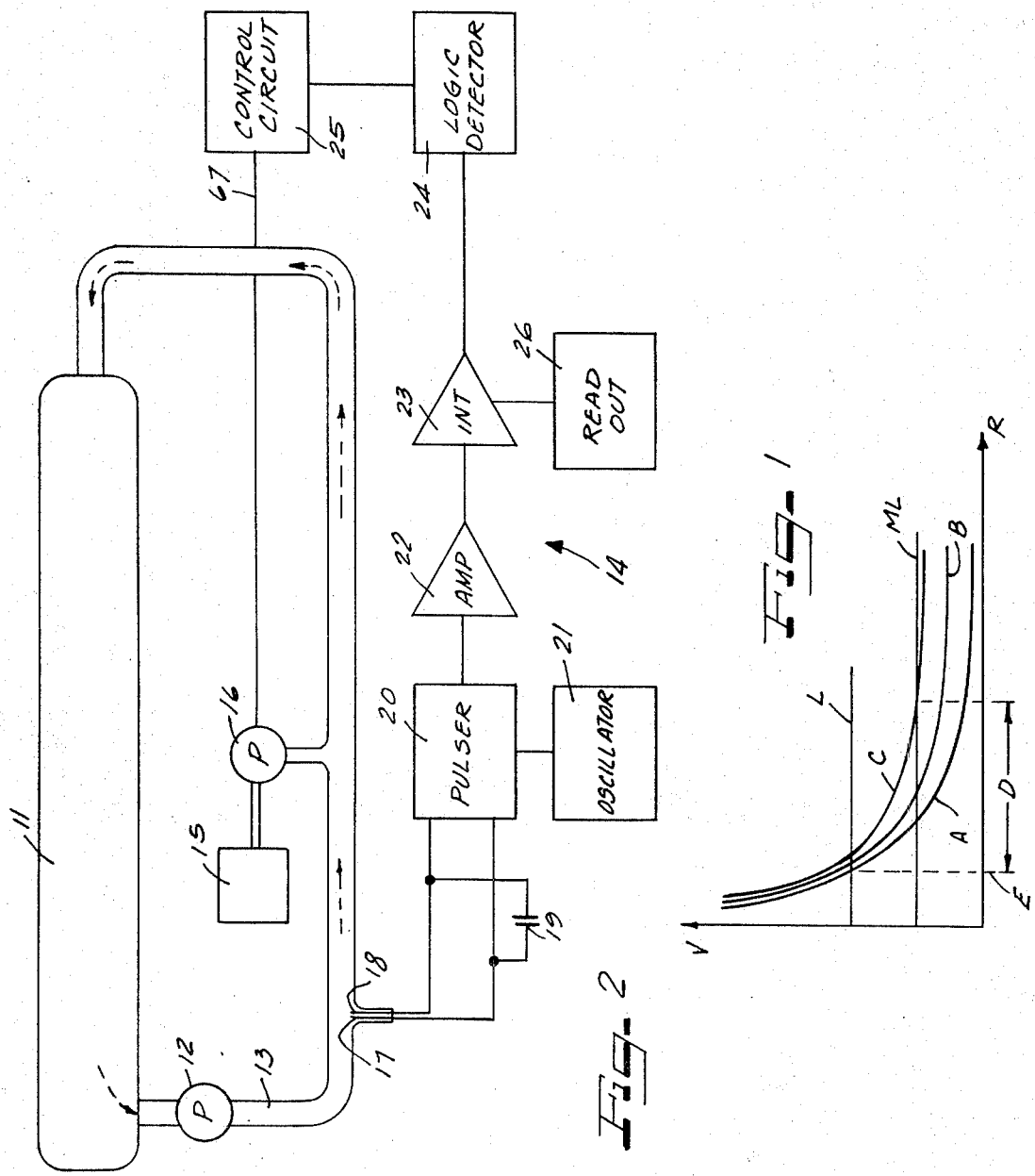

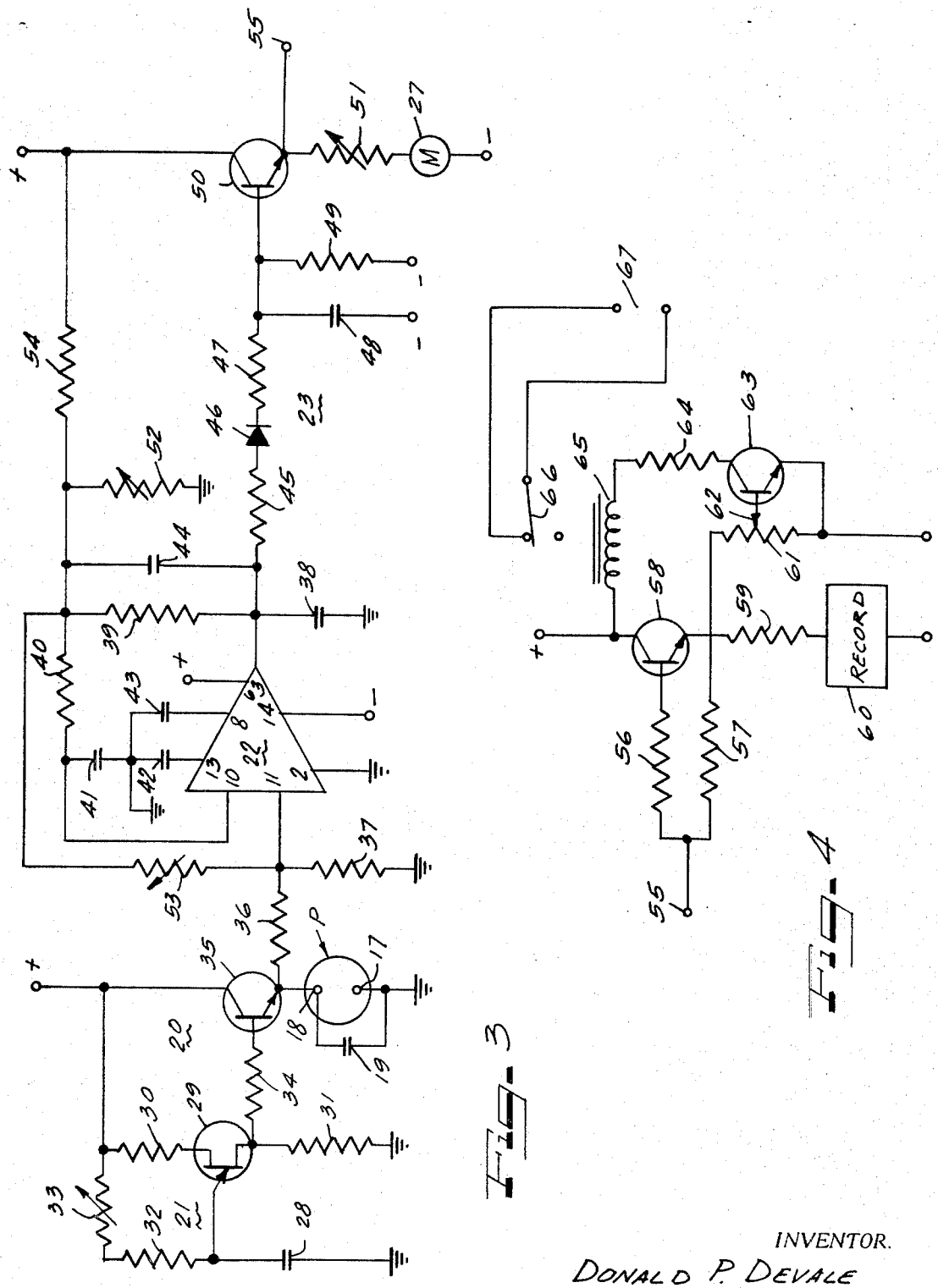

APPARATUS FOR MONITORING AND CONTROLLING HALOGEN LEVELS IN A WATER TREATMENT SYSTEM

BACKGROUND OF THE INVENTION

1. Field of the Invention

This invention relates to an improved method and apparatus for measuring and controlling the halogen content of a liquid, particularly water, and is particularly concerned with the utilization of techniques for detecting halogen content of a liquid on a continuous fluid flow, dynamically sensed basis.

2. Description of the Prior Art

Heretofore, one method of monitoring and controlling the amount of halogen in a liquid, such as water, was to obtain a sample of the liquid, add appropriate chemicals to the sample of the liquid, measure the color change of the liquid due to the chemical addition, and add halogen in accordance with the results of this somewhat qualitative test.

Other techniques have been employed to either qualitatively or relatively quantitatively measure the halogen content of a liquid with equipment which is generally electronic in nature. One known technique involves the placement of a pair of electrodes in the liquid and applying a steady DC potential thereto. The electrodes are connected to a conductivity sensing device, such as the base-emitter circuit of a transistor, for providing a measure of the conductivity of the fluid across the electrodes. Such a system has proven somewhat unsatisfactory for several reasons. Primarily, the application of a constant DC potential to the electrodes initiates a plating process with the attendant necessity for periodic high level repolarization of the electrodes. A further attendant disadvantage of such a system, when applied to swimming pools and the like, is the general inconvenience caused by the requirement for repolarization. With respect to a water supply system, the general increasing inaccuracy as plating increases is undesirable and it would be necessary to resort to charts relating running time and plating to normalize the impedance or conductivity factor at the plated electrodes.

SUMMARY OF THE INVENTION

It is therefore the primary object of the present invention to provide an improved method and apparatus for monitoring and controlling halogen level in liquids, particularly in water.

Another object of the invention is to provide an improved method and apparatus for controlling the halogen level in a liquid by sensing the halogen level in a continuously flowing stream of the liquid.

Still another object of the invention is to provide an improved method and apparatus for measuring the halogen level in a liquid by dynamic techniques so as to avoid plating of sensing electrodes disposed in the liquid.

The present invention will be set forth using water and chlorine as examples of the fluid and halogen for treating the fluid since wide application of apparatus embodying the principles of this invention may be made with respect to swimming pools and municipal water systems.

The oxidation/reduction level of halogens in water are considerably lower than most of the other compounds and salts, acids and bases normally found in or added to water. A resistance versus applied voltage curve can be drawn for water containing a multitude of elements in solution whereby it can be shown that resistance increases as the applied voltage decreases since conduction primarily occurs due to the ionization level and since below a certain level of voltage the electromotive force is insufficient to cause electron flow. However, the halogens extend this level sufficiently below those of other salts or solutions so that measuring the resistance across electrodes disposed in the water at a low voltage level will generate results that are unique to halogens alone.

In view of the foregoing, it has been discovered that the problem of measurement or monitoring of halogen content in water is the ability to measure the resistance of the water at a sufficiently low voltage level so that only the halogen content becomes a factor in the resistivity of the water.

In view of the unique low voltage level resistance characteristic of a halogen containing fluid, such as chlorine in water, and according to the present invention, the foregoing objectives are realized through the provision of monitoring and control techniques in which the resistance of the fluid is detected on a dynamic basis.

The overall system generally comprises a pair of electrodes disposed in a continuous stream of the liquid, here water, undergoing treatment, a capacitor connected across the electrodes, means for pulsing the electrode and capacitor parallel combination to charge the capacitor and permit discharge thereof in accordance with the resistance of the water. A high input impedance detection circuit is utilized to determine when the voltage across the capacitor has decreased to a predetermined level and operates to control apparatus for adding chlorine to the water upon detection of voltage decay to the predetermined level. Circuitry for performing the foregoing function includes a timing circuit which applies, for example, 20 micro-second pulses to the electrodes and a trigger circuit which provides the measurement function. The basic measurement is time and the circuit measures the time required for the capacitor to discharge through the water from six volts down to one-tenth volt.

The timing circuit is set for unchlorinated water such that just before the trigger circuit is to function, a second pulse is generated and applied to the capacitor for charging and charge decay. If the trigger circuit does not operate, subsequent stages are not activated to add chlorine. It has been determined that time is directly proportional to the resistance of the solution undergoing treatment. Therefore, the frequency of pulsing and the rate of decay are advantageously employed as a time measurement in determining whether chlorine should be added.

According to another aspect of the invention, a meter is provided for giving a visual indication of the chlorine content of the treated water. For water which is free of halogen (chlorine), the meter will read zero. As chlorine is added to the water, the time necessary to discharge the capacitor to the one-tenth volt level decreases. Therefore, the firing point of the trigger circuit is reached before the next wave arrives and the amount of time that the trigger circuit is off is directly proportional to the chlorine level of the water. The output waveform is a series of pulses whose duty cycle is integrated to provide the meter output.

BRIEF DESCRIPTION OF THE DRAWINGS

Other objects, features and advantages of the invention, its organization, construction and operation, will best be understood from the following detailed description of a preferred embodiment thereof taken in conjunction with the accompanying drawings, in which:

FIG. 1 is a graphical illustration of the voltage decay across a capacitor for water with respect to halogens and other impurities normally added to or found therein;

FIG. 2 is a block diagram of a water treatment system setting forth techniques employed in practicing the present invention;

FIG. 3 is a schematic circuit diagram of a portion of the system illustrated in FIG. 1; and FIG. 4 is a schematic circuit diagram of another portion of the system illustrated in FIG. 1.

DESCRIPTION OF THE PREFERRED EMBODIMENTS

In FIG. 1, three resistance characteristics of water A, B, and C illustrate how the amount of impurities therein affect resistance of the water between a pair of electrodes with respect to the voltage applied across the electrodes. It has been determined, as mentioned above, that the resistance of water, for example, measured at a low voltage level, is unique with respect to the halogen content of the water. FIG. 1 has not been drawn to any particular scale, but is somewhat exaggerated to illustrate that above a certain voltage level L, the resistance of water changes very little with respect to halogen content and that below the level L, halogens have a unique effect (see above a time level E). Increased halogen levels (curve A is for greater levels of halogen than curve C), the voltage stored in the subject capacitor asymptotically approaches zero along a greater arc than at lower levels. If one singles out a range of voltage for sensing purposes, such as the range D, the spreading of the time to discharge to voltage ML on the curves can quite advantageously be utilized as an accurate indication of halogen content. For example, distilled water having added thereto 1 ppm chlorine has a generally unique resistance characteristic in a range which extends from generally zero to 1.5 volts, If, for example, 0.6 volts are applied across the electrodes, the impedance has been determined to be about 2 megohms. With 0.6 volts applied, 2 megohms would be the resistive component of the time constant for discharging the aforementioned storage capacitor. With halogen added, the effective resistance would be less thereby increasing the discharge rate (decreasing discharge time). These characteristics and their utilization will best be understood from the following description of a monitoring and control system constructed in accordance with the principles of the invention.

Referring to FIG. 2, a water treatment system is generally illustrated at 10 as comprising a reservoir 11, such as a commercial water supply or a swimming pool, a pump 12 for circulating water from the reservoir 11 through a conduit 13 and back to the reservoir, and a control system generally referenced 14 for controlling the addition of chlorine from a chlorine source 15 to the stream of water traversing the conduit 13 by way of a pump 16.

The control system 14 includes a pair of spaced electrodes 17, 18 which are disposed in the continuous flow of water through the conduit 13. These electrodes may advantageously be constructed of platinum. A capacitor 19 is connected across the electrodes 17 and 18 and the parallel combination is fed by a pulser 20 that is driven by an oscillator 21.

The capacitor 19 is connected by way of the pulser 20 to an amplifier 22 which takes the form of a trigger circuit for generating a pulse waveform. The waveform is operated on by an integrator 23 and utilized to control logic detector 24 which in turn operates a control circuit 25 to control the operation of the pump 16 and the addition of halogen to the conduit 13. The integrator 23 has connected thereto readout apparatus 26 for providing a visual display of chlorine content of the water.

Referring to FIG. 3, a portion of the control system 14 is illustrated including the electrodes 17, 18 connected in a probe P and shunted by the capacitor 19, the oscillator 21, the pulser 20, the trigger circuit 22 and the integrator 23. Also illustrated is a portion of the readout apparatus 26 in the form of a meter 27.

The oscillator 21 includes a capacitor 28 connected between ground and the emitter electrode of a unijunction (UJT) 29, which has another electrode thereof connected by way of a resistor 30 to a positive supply potential and a third electrode thereof connected by way of a resistor 31 to ground. The emitter electrode of the UJT transistor 29 and the capacitor 28 are connected to the positive supply potential by way of a resistor 32 and a variable resistor 33 which is adjustable to change the frequency of oscillation. The oscillator is a simple relaxation oscillator of the type well known in the art and no further discussion thereof is deemed necessary. The UJT transistor 29 is utilized to couple the output of the oscillator by way of a resistor 34 to the base of a transistor 35 of the pulser 20. The transistor 35 includes a collector which is connected to the positive electrical supply potential and an emitter which is connected to the electrode 18 of the probe P and to the capacitor 19 connected in shunt across the electrodes 17, 18.

The amplifier circuit 22 may include a well-known integrated circuit such as an RCA CA3047 connected as a trigger circuit and having a high input impedance supplied thereto by way of a resistor 36 and a resistor 37. The trigger circuit 22 includes a plurality of components 38–43 for maintaining stability and the proper frequency response as is well known in the art. The trigger circuit 22 operates in conjunction with an integrator 23 which comprises a capacitor 44, a resistor 45, a diode 46, a resistor 47, and a capacitor 48. The trigger circuit 22 and the integrator 23 are operable in two modes. In one of these modes, the circuits are dimensioned so that the integrator 23 integrates the duration of the output of the trigger circuit 22 relative the duration of the oscillator pulse wherein the charging of the capacitor 48 with respect to a negative potential by way of the resistor 39, the resistor 45, the diode 46 and the resistor 47. The integrated signal derived across the capacitor 48 and a resistor 49 in parallel therewith is applied to the base of a transistor 50. The transistor 50 has its collector connected to the positive supply potential and its emitter connected to the negative supply potential by way of a variable resistor 51 and the meter 27. The meter therefore responds to the integrated signal to provide a reading that is representative of the chlorine content of the water. The resistor 51 may be adjusted to calibrate the meter 27.

In another mode of operation, the trigger circuit 22, which has a variable resistor 52 for setting its trigger level by way of the resistor 40, is provided with a feedback loop from its output to its signal sensing input by way of the resistor 39 and a variable resistor 53 which may be adjusted so that the negative feedback desensitizes the trigger circuit to decrease the gain of the amplifier whereby the output is the decay waveform of the input (inverted) so that less output at the probe P provides a greater output for the amplifier. This also provides for an extremely accurate response with respect to low level signals and, as stated above, it is at such low level signals that halogens provide a unique resistance characteristic. For example, such a level would advantageously be approximately 0.6 volts. In this mode, the integrator 23 is accordingly provided with signals for integration and display at the meter 27 that are of a higher ratio with respect to the input signals.

The trigger circuit 22 and the integrator 23 are provided with a resistor 52 as a means of deriving bias and trigger potentials, as is well known in the art.

The logic detector 24 and the control circuit 25 may take many forms. In FIG. 4, the circuits have been combined to perform the functions of logic detection, pump control governing the addition of chlorine, and controlling the recording of halogen content over a predetermined period of time. The circuit of FIG. 4 includes an input terminal 55 which is connected to the like numbered terminal 55 of the emitter of the transistor 50 to extend the integrated signal to the base of a transistor 58 by way of a resistor 56. The collector of the transistor 58 is connected to the positive supply potential and the emitter is connected to the negative supply potential by way of a resistor 59 and a recorder 60 which may be one of many well known types wherein a pen or the like is operated in response to the signal to mark a paper strip or disc.

The signal at the terminal 55 is also fed to the base of a transistor 63 by way of a resistor 57 and a variable resistor 61 having a movable tap 62 connected to the base of the transistor 63. The emitter of the transistor 63 is connected in common with the resistor 61 to the negative supply potential and the collector is connected to the positive supply potential by way of a resistor 64 and a relay winding 65. The resistor 61 may be set to a predetermined bias potential for the transistor 63 so that the transistor operates upon detection of a level of the integrated signal which is representative of a desired level at which chlorine is to be added to the water as detected at the probe P, for example at one-tenth volt. Detection of this level at the probe P, as reflected at the resistor 61, causes the transistor 63 to conduct and the relay winding 65 to be energized. This in turn opens the relay contacts 66 to deactivate the pump 16 which is connected to the output terminals 67. When the chlorine level falls below this predetermined amount, the transistor 63 is rendered nonconductive to de-energize the relay winding 65 and to permit the contacts 66 to close. The pump 16 is therefore activated to add chlorine from the source 15 to the conduit 13. It should be noted in FIG. 2 that the addition of chlorine takes place downstream with respect to the sensing electrodes 17, 18 so that the proper dilution takes place in the reservoir 11 and also prevents inaccurate sensing of high chlorine levels downstream from the pump 16.

From the foregoing, it is readily evident that the objects of the present invention have been met to provide a continuous flow monitoring and control process which requires no separate monitoring or addition of testing chemicals. The total system is therefore substantially a maintenance free system. It has also been shown that the present invention provides for the calibrated continuous readout of halogen content of the fluid being treated or measured. The present invention further provides means by which the halogen level may be controlled such that swimming pools, public water sources, and sewage treatment may be monitored and controlled on a continuous and dynamic basis. It has further been disclosed that the foregoing advantages can be realized through the provisions of simple techniques and circuit means for switching on and off pumps in response to a demand signal, and that the demand signal may be advantageously derived from a very low level voltage across sensing electrodes disposed in the fluid stream, which low level voltage is advantageously related to resistance characteristics which are unique to halogens.

Although I have disclosed my invention by reference to a specific illustrative embodiment thereof, many changes and modifications of my invention may become apparent to those skilled in the art without departing from the spirit and scope of the invention, and it is to be understood that I intend to include within the patent warranted hereon all such changes and modifications as may reasonably and properly be included within the scope of my contribution to the art.

What I claim is:

1. A method of controlling the halogen content of a liquid comprising the steps of:
   pumping a stream of the liquid from a reservoir and back to the reservoir;
   pulsing a charge storage device and permitting the charge to decay via the liquid between electrodes disposed in the stream;
   detecting the charge decay between pulses; and
   adding halogen when the charge decays to a predetermined level.

2. The method set forth in claim 1, wherein the step of pulsing is further defined as pulsing the charge storage device with low voltage pulses.

3. The method set forth in claim 1, wherein the step of adding halogen is further defined as pumping halogen into the liquid at a point downstream of the electrodes.

4. The method set forth in claim 1, wherein the step of detecting is further defined as generating a waveform having a duty cycle that is dependent upon the time that the halogen level is below the predetermined level, integrating the waveform to obtain a signal indicative of the halogen level, and recording halogen level in accordance with the integrated signal.

5. Apparatus for monitoring halogen content of a liquid, comprising:
   a pair of electrodes disposed in the liquid;
   a capacitor connected across said electrodes;
   means for periodically pulsing said capacitor to store a charge therein, the stored charge decaying between pulses via the liquid between said electrodes at a rate governed by the halogen content of the liquid;
   means for sensing the charge across said capacitor and operable to generate a halogen level indication signal; and
   display means operable in response to the halogen level indication signal to provide a visual display of the halogen content.

6. Apparatus for monitoring and controlling the halogen content of a liquid, comprising:
   a pair of electrodes disposed in the liquid;
   a capacitor connected to said electrodes;
   means for repetitively pulsing said capacitor to store charge therein, the voltage across said capacitor due to the charge decaying due to discharging by way of said electrodes and the resistance of the liquid therebetween;
   sensing means operable to generate a signal when the level of halogen, represented by the decaying voltage, reaches a predetermined level; and
   means operable in response to said signal to add halogen to the liquid.

7. Apparatus according to claim 6, wherein said means for repetitively pulsing comprises a switch connected between said capacitor and an electrical supply potential and an oscillator operable to periodically close said switch.

8. Apparatus according to claim 6, wherein said sensing means comprises a trigger circuit including means for establishing a trigger level, means connected to said capacitor and operable to generate a pulse waveform whose duty cycle is dependent upon sensed voltages at said capacitor which are above and below a predetermined level, and means for integrating said waveform to provide said signal to add halogen.

9. Apparatus according to claim 6, wherein said means operable to add halogen comprises a detector for detecting the halogen addition signal, a source of halogen, pump means for delivering halogen from said source to the liquid and switch means connected between said pump means and said detector for controlling the operation of said pump means upon detection of said halogen addition signal.

10. A water system having controlled chlorine content, comprising:
    a reservoir for holding water;
    a fluid passageway having a first end connected in fluid communication with said reservoir and a second end connected in fluid communication with said reservoir, and pump means operable to pump water through said passageway to form a water circuit;
    a pair of electrodes disposed in said passageway with the flowing water forming a unique electrical resistance between said electrodes in accordance with the chlorine content of the water;
    a charge storage device connected across said electrodes;
    means for periodically charging said charge storage device, the charge decaying via the unique electrical resistance of the flowing water;
    detecting means connected to said charge storage device operable to produce a chlorine addition signal upon detection of charge decay to a predetermined level; and
    chlorine addition means connected in communication with said water circuit and connected to said detecting means and operable in response to said chlorine addition signal to add chlorine to the water.

11. The water system set forth in claim 10, wherein said charge storage device includes a capacitor.

12. The water system set forth in claim 10, wherein said means for periodically charging said charge storage device comprises switching means connected between said charge storage device and an electrical supply, and an oscillator connected to operate said switching means at a frequency set sufficiently high to prevent decay to said predetermined level when at least the desired amount of chlorine is in the water.

13. The water system set forth in claim 10, wherein said detecting means comprises a trigger circuit connected to said charge storage device and operable to generate a waveform whose duty cycle is dependent upon time which the charge on said charge storage device is below said predetermined level, an integrator for integrating the waveform, and means for producing said chlorine addition signal when the integrated waveform represents chlorine content below said predetermined level.

14. A method of controlling the halogen content of a liquid comprising the steps of:
    moving halogen carrying liquid past a charge storage device;
    pulsing the charge storage device and permitting the charge to decay via the liquid between the electrodes disposed in the moving liquid;
    detecting the charge decay between pulses; and
    adding halogen to the liquid when the charge decays to a predetermined level.

* * * * *